US008612463B2

(12) United States Patent
Brdiczka et al.

(10) Patent No.: US 8,612,463 B2
(45) Date of Patent: Dec. 17, 2013

(54) IDENTIFYING ACTIVITIES USING A HYBRID USER-ACTIVITY MODEL

(75) Inventors: Oliver Brdiczka, Mountain View, CA (US); Shane P. Ahern, Foster City, CA (US); Victoria M. E. Bellotti, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 258 days.

(21) Appl. No.: 12/793,238

(22) Filed: Jun. 3, 2010

(65) Prior Publication Data

US 2011/0302169 A1 Dec. 8, 2011

(51) Int. Cl.
G06F 17/30 (2006.01)
(52) U.S. Cl.
USPC ......................................................... 707/758
(58) Field of Classification Search
USPC .................. 707/601, 602, 758, 776, 802, 803
See application file for complete search history.

(56) References Cited

U.S. PATENT DOCUMENTS

| 7,165,105 B2* | 1/2007 | Reiner et al. .................. 709/224 |
| 2002/0152213 A1* | 10/2002 | Barrett et al. ................... 707/10 |
| 2002/0198979 A1* | 12/2002 | Yu ................................. 709/224 |
| 2003/0115333 A1* | 6/2003 | Cohen et al. ................... 709/227 |
| 2003/0135818 A1* | 7/2003 | Goodwin et al. .............. 715/500 |
| 2005/0182773 A1* | 8/2005 | Feinsmith ...................... 707/100 |
| 2005/0256956 A1* | 11/2005 | Littlefield et al. ............. 709/225 |
| 2006/0259293 A1* | 11/2006 | Orwant .............................. 704/9 |
| 2009/0164932 A1* | 6/2009 | Ritter ............................. 715/772 |
| 2010/0131323 A1* | 5/2010 | Basson et al. ...................... 705/8 |
| 2010/0191682 A1* | 7/2010 | Takamatsu ....................... 706/12 |
| 2010/0191737 A1* | 7/2010 | Friedman et al. ............. 707/740 |
| 2010/0223212 A1* | 9/2010 | Manolescu et al. ............. 706/12 |
| 2011/0106584 A1* | 5/2011 | Borthwick et al. .......... 705/7.31 |

OTHER PUBLICATIONS

Dragunov, Anton N. et al., "TaskTracer: A Desktop Environment to Support Multi-tasking Knowledge Workers", Jan. 2005, Proceedings of the 10th international conference on Intelligent user interfaces, pp. 75-82.
Blei, David M., et al., "Latent Dirichlet Allocation", Journal of Machine Learning Research 3 (2003) 993-1022, 2003.
Muhlenbrock, Martin et al., "Learning to Detect User Activity and Availability from a Variety of Sensor Data", Proceedings of the Second IEEE Annual Conference on Pervasive Computing and Communications, 2004.
Shen, Jianqiang et al., "Real-Time Detection of Task Switches of Desktop Users", 2007.

(Continued)

Primary Examiner — Cam-Linh Nguyen
(74) Attorney, Agent, or Firm — Shun Yao; Park, Vaughan, Fleming & Dowler LLP

(57) ABSTRACT

In a user-activity identification technique, a user's actions are monitored while the user is using a computer. While these user actions are associated with user activities, the user activities are initially unspecified, so the tracked user actions constitute unsupervised data. Then, the tracked user actions are aggregated into subsets (for example, using clustering analysis), and user-activity classifications for the subsets (such as activity labels) are provided by the user, so the subsets constitute supervised data. Subsequently, when additional user actions (which are associated with one or more initially unspecified current user activities) are tracked, they can be associated with one or more of the classified subsets. For example, information about the additional user actions can be mapped in real time (or near real time) to one or more of the subsets using a supervised learning technique. In this way, the one or more current user activities can be identified.

18 Claims, 8 Drawing Sheets

(56) References Cited

OTHER PUBLICATIONS

Bellotti, Victoria et al., "Intelligibility and Accountability: Human Considerations in Context-Aware Systems", Human-Computer Interaction, 2001, vol. 16, pp. 193-212.

Erickson, Thomas "Some Problems with the Notion of Context-Aware Computing", Feb. 2002, vol. 45, No. 2, Communications of the ACM, pp. 102-104.

* cited by examiner

IDENTIFYING ACTIVITIES USING A HYBRID USER-ACTIVITY MODEL

BACKGROUND

1. Field

The present disclosure relates to techniques for identifying current user activities. More specifically, the present disclosure relates to techniques for identifying current user activities based on supervised activity classes.

2. Related Art

While there have been advances in activity recognition techniques for computer users, accuracy and ease of use are still challenging. These issues are particularly difficult for novice users. For example, in order to use most activity recognition techniques, users are often required to train the systems. Thus, a user may be requested to label their current activities in real time, or may need to answer activity queries at random times. However, training an activity recognition technique can be time-consuming and annoying, which can significantly degrade the user experience. Alternatively, when users do not provide training feedback, the accuracy of the resulting untrained activity recognition techniques is often unacceptably poor.

Hence, what is needed is a method and a system that facilitates activity recognition without the problems listed above.

SUMMARY

The disclosed embodiments relate to a computer system that identifies one or more current user activities. During operation, the computer system receives user-action information associated with user activities, where the user activities are initially unspecified and the user-action information comprises unsupervised data. Then, the computer system identifies subsets of the user-action information, and receives classifications from a user of the user activities associated with the identified subsets of the user-action information. Note that the identified subsets of the user-action information comprise supervised data. Furthermore, the computer system receives additional user-action information associated with the one or more current user activities, where the one or more current user activities are initially unspecified and the additional user-action information comprises unsupervised data. Next, the computer system determines a group of the identified subsets of the user-action information based on the additional user-action information, thereby identifying the one or more current user activities.

For example, receiving the user-action information may involve monitoring user interaction with an electronic device. Consequently, the user-action information may include: a keyword associated with a document accessed by the user, the document accessed by the user, an individual with whom the user communicates information, and/or an appointment in a user schedule. Moreover, the user activities may include a temporal sequence of user actions that modify content or communicate information. This temporal sequence of user actions may occur over multiple sessions, and the user activities may be associated with one or more corresponding objectives of a project.

In some embodiments, identifying the subsets of the user-action information involves performing a clustering analysis. Furthermore, a given classification of the user activities in the received classifications of the user activities may be associated with multiple subsets of the user-action information.

Additionally, determining the group of the identified subsets of the user-action information may involve generating probabilistic scores for the subsets of the user-action information based on the additional user-action information. For example, a given probabilistic score for a given subset of the user-action information may be generated using a weighted summation of matches between the additional user-action information and the user-action information in the given subset of the user-action information. Alternatively or additionally, the probabilistic scores may be generated using the user-action information in the given subset of the user-action information that is associated with a time window preceding the one or more current user activities.

In some embodiments, the computer system filters the received user-action information to eliminate extraneous user-action information prior to identifying the subsets of the user-action information. Furthermore, determining the group of the identified subsets of the user-action information may involve selecting a pre-defined group of the subsets of the user-action information based on the generated probabilistic scores. Alternatively or additionally, determining the group of the identified subsets of the user-action information may be based on contextual information associated with the additional user-action information.

Note that the user-action information and the additional user-action information may each be associated with tasks, and a given user activity may be associated with a temporal sequence of multiple tasks. In these embodiments, the computer system may identify transitions between the tasks based on the user-action information or the additional user-action information, and determining the group of the identified subsets of the user-action information may be based on the identified transitions.

The identified current user activities may be used in a variety of ways. For example, the computer system may update a time card of the user based on the identified one or more current user activities. Alternatively or additionally, the computer system may provide an activity update to another individual based on the identified one or more current user activities. This activity update may alert the other individual when the user can be contacted without interrupting the one or more current user activities.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
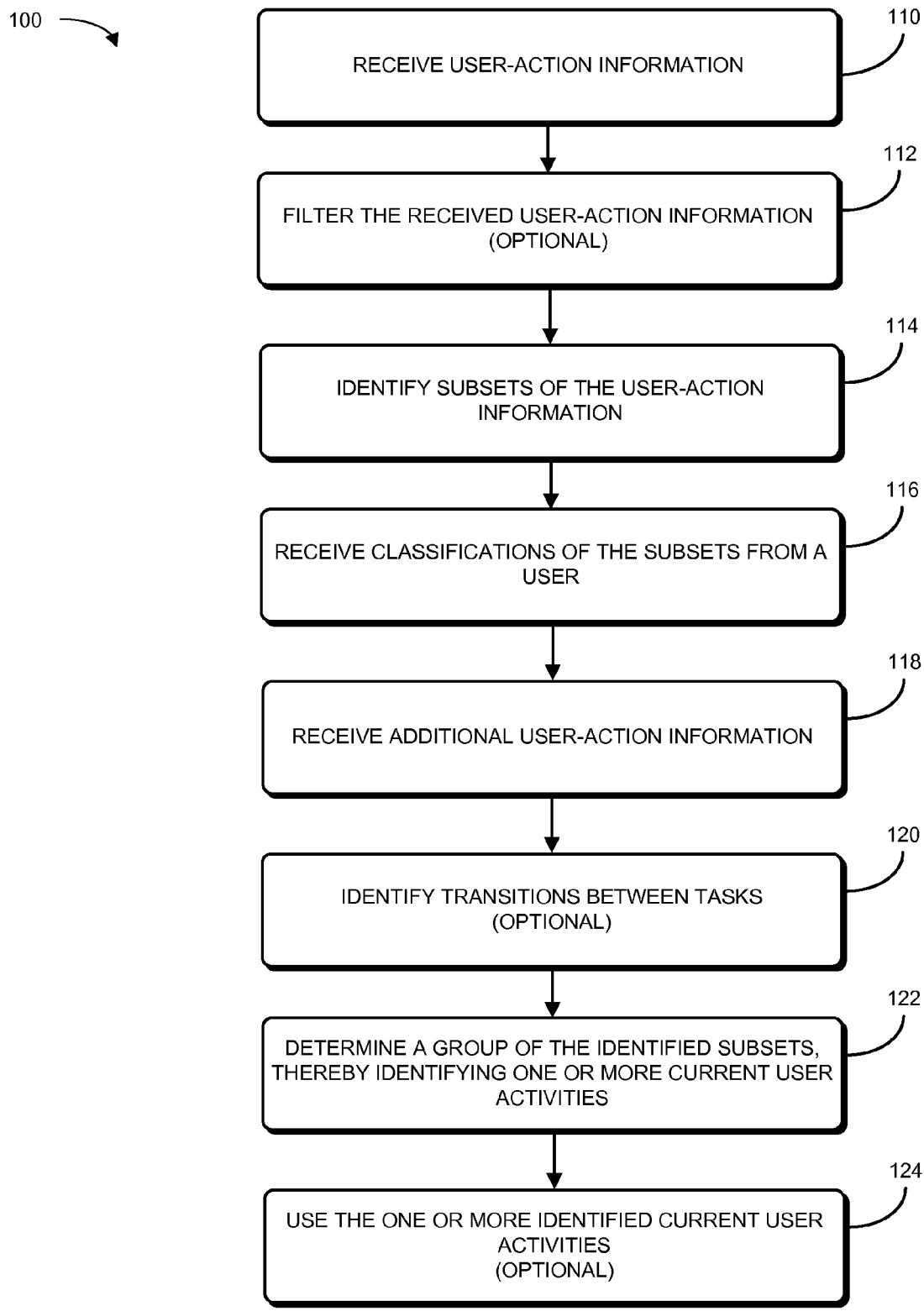
FIG. 1 is a flow chart illustrating a method for identifying one or more current user activities in accordance with an embodiment of the present disclosure.

Embodiments of a computer system, a method, and a computer-program product (e.g., software) that identify one or more current user activities are described. In a user-activity identification technique, a user's actions are monitored while the user is using a computer. While these user actions are associated with user activities, the user activities are initially unspecified, so the tracked user actions constitute unsupervised data. Then, the tracked user actions are aggregated into subsets (for example, using clustering analysis), and user-activity classifications for the subsets (such as activity labels) are provided by the user, so the subsets constitute supervised data. Subsequently, when additional user actions (which are associated with one or more initially unspecified current user activities) are tracked, they can be associated with one or more of the classified subsets. For example, information about the additional user actions can be mapped in real time (or near real time) to one or more of the subsets using a supervised learning technique. In this way, the one or more current user activities can be identified.

By identifying the one or more current user activities, the user-activity identification technique facilitates a wide variety of solutions that can: improve the user's time management, reduce the user's (or their organization's) business costs and/or improve the user's quality of life (for example, by reducing interruptions while the user is working, which can increase the user's happiness). Consequently, the user-activity identification technique may facilitate increased productivity and profitability.

In the discussion that follows, event tracking while the user is using a computer (and, more generally, an electronic device) is used as an illustrative example of user-action information that is monitored and subsequently used to help identify the one or more current user activities. However, it should be understood that the hybrid approach in the user-activity identification technique may be applied to a wide variety of user-action information, including information other than that immediately associated with the use of the computer. This other user-action information may include: auditory information (such as speech), visual information (such as video images of the user or other individuals), motion information associated with movement of the user, assessments of user emotions, and/or location information (such as positions of the user relative to objects in the surrounding environment, for example, based on a location of a cellular telephone used by the user).

Furthermore, in the discussion that follows there may be a hierarchical relationship between projects, activities, tasks and actions. In particular, a project may be associated with multiple activities, which, in turn, may involve multiple tasks that each may involve multiple actions. Furthermore, a project may involve an overall goal or objective (such as obtaining an advanced degree) and, more generally, a work objective that is achieved over time. The activities associated with a project may occur in a sequence, and may involve creating value-added content and/or communicating this content with others to help achieve the objective of the project. For example, activities may include: organizing a meeting, hiring an employee, performing an appraisal, generating a budget, attending a regular meeting, solving a problem, etc. Similarly, tasks and actions are associated (on progressively shorter time scales) with different semantic spaces or contexts that involve achieving the goals or objectives of the (respective) immediately preceding levels in the hierarchy. Thus, tasks may include portions of activities (such as editing a document), while actions may include a primitive operation (such as opening a file, performing a mouse click, etc.). Note that, in general, any of the elements in the hierarchy may be defined positively or negatively (for example, a task may include something the user is doing or something the user is not doing).

We now discuss embodiments of the user-activity identification technique. FIG. 1 presents a flow chart illustrating a method 100 for identifying one or more current user activities, which may be performed by a computer system (such as computer systems 600 or 700 in FIGS. 6 and 7). During operation, the computer system receives user-action information associated with user activities (operation 110), where the user activities are initially unspecified and the user-action information comprises unsupervised data. For example, receiving the user-action information may involve monitoring user interaction with an electronic device (such as a computer). Consequently, the user-action information may include: a keyword associated with a document (such as an email or a word-processing document) accessed by the user, the document that is accessed by the user, an individual with whom the user communicates information, and/or an appointment in a user schedule. More generally, the user-action information may encompass any of the entire scope of user actions that the user can perform with the electronic device. Moreover, the user activities may include a temporal sequence of user actions that modify content and/or communicate information. This temporal sequence of user actions may occur over multiple sessions, and the user activities may be associated with one or more corresponding objectives of a project (such as applying to college, getting a job, etc.).

Then, the computer system identifies subsets of the user-action information (operation 114), and receives classifications from a user of the user activities associated with the identified subsets of the user-action information (operation 116). Note that the identified subsets of the user-action information comprise supervised data. For example, identifying the subsets of the user-action information may involve performing a clustering analysis. In addition, a given classification of the user activities in the received classifications of the user activities may be associated with multiple subsets of the user-action information.

Subsequently, the computer system receives additional user-action information (i.e., user-action information that occurs after the previously received user-action information in operation 110) that is associated with the one or more current user activities (operation 118), where the one or more current user activities are initially unspecified and the additional user-action information comprises unsupervised data. Next, the computer system determines at least a group of the identified subsets of the user-action information based on the additional user-action information and the identified subsets of the user-action information (operation 122), thereby identifying the one or more current user activities.

For example, the additional user-action information may be compared to the identified subsets of the user-action information using a supervised-learning model to determine at least the group of the identified subsets of the user-action information. In some embodiments, determining the group of the identified subsets of the user-action information may involve generating probabilistic scores for the subsets of the user-action information based on the additional user-action information. In particular, a given probabilistic score for a given subset of the user-action information may be generated using a weighted summation of matches between the additional user-action information and the user-action information in the given subset of the user-action information. Alternatively or additionally, the probabilistic scores may be generated using the user-action information in the given subset of the user-action information that is associated with a time window preceding the one or more current user activities (i.e., the user-action information may be dynamic or time varying, and portions of the data within one or more time intervals may be used to determine the associations).

Furthermore, determining the group of the identified subsets of the user-action information may involve selecting a pre-defined group of the subsets of the user-action information based on the generated probabilistic scores. For example, a pattern of associated subsets may be used to identify the one or more current user activities (instead of using a single subset that has a maximum or extremum association value). Alternatively or additionally, determining the group of the identified subsets of the user-action information may be based on contextual information associated with the additional user-action information, such as: a time of day, a day of the week, a source of the additional user-action information (e.g., a document the user viewed or an application program that the user used), and/or (if possible) passive information that can be collected without disturbing the user.

In some embodiments, the computer system optionally filters the received user-action information to eliminate extraneous user-action information prior to identifying the subsets of the user-action information (operation 112). Note that the user-action information and the additional user-action information may each be associated with tasks, and a given user activity may be associated with a temporal sequence of multiple tasks. In these embodiments, the computer system may optionally identify transitions between the tasks based on the user-action information and/or the additional user-action information (operation 120), and determining the group of the identified subsets of the user-action information may be based on the identified transitions.

The identified current user activities may be used in a variety of ways. Thus, the computer system may optionally use the one or more identified current user activities (operation 124). For example, the computer system may update a time card of the user based on the identified one or more current user activities. More generally, the computer system may assist the user in managing their time, for example, by assessing resources used by the user or by pre-fetching related documents associated with the identified current user activities, so that the user can be more efficient and productive.

Alternatively or additionally, the computer system may provide an activity update to another individual based on the one or more identified current user activities. This activity update may alert the other individual when the user can be contacted without interrupting the one or more current user activities. For example, based on the activity update, a visual clue (such as an icon) may be displayed in a communication program or on a communication device to alert the other individual when to try to contact the user. More generally, by assisting the user in focusing on a finite number of user activities at a given time, the user-activity identification technique may facilitate increased user happiness.

Figure 2:
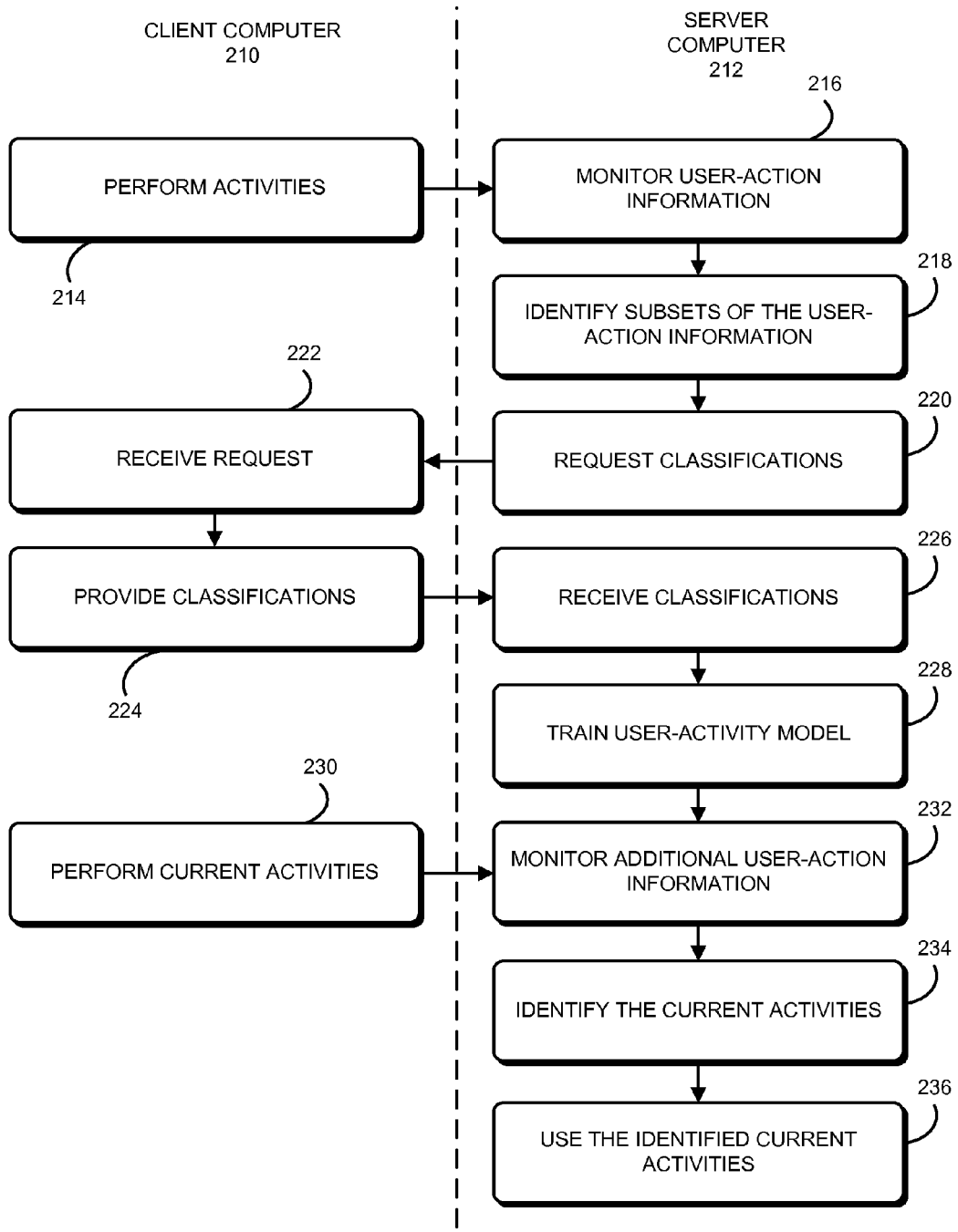
FIG. 2 is a flow chart illustrating the method of FIG. 1 in accordance with an embodiment of the present disclosure.

In an exemplary embodiment, the user-activity identification technique is implemented using one or more client computers and at least one server computer, which communicate through a network, such as the Internet (i.e., using a client-server architecture). This is illustrated in FIG. 2 (and in FIG. 6 below), which presents a flow chart illustrating method 100 in FIG. 1. During this method, a user of computer 210 performs activities (operation 214). These user activities may be associated with multiple tasks, which, in turn, may be associated with multiple user actions. Server computer 212 may monitor user-action information associated with the user actions, for example, by event tracking or logging over one or more sessions (operation 216). Then, the user-action information is aggregated to identify subsets of the user-action information (operation 218). For example, there may be 10,000 different metrics in user-action information (such as a document that was accessed, content of a window or screen, content in an email, an addressee of a message, a keyboard input, a user gesture, a web page that was viewed, an appointment in a user schedule, etc.), and 10 different subsets may be identified.

Next, server computer 212 may request classifications (such as user-activity labels) for one or more of the subsets (operation 220). This request may be received by the user of computer 210 (operation 222). In response, the user may provide the classifications (operation 224), which are received by server computer 212 (operation 226). For example, the user may provide three user-activity labels (such as projects) that encompass the 10 different identified subsets. (In general, the number of identified subsets is larger than the number of classifications.)

The combination of the subsets of the user-action information and the associated classifications may be used by server computer 212 to train or generate a user-activity model (operation 228). Subsequently, when the user performs one or more current activities (operation 230) on computer 210, server computer 212 may monitor additional user-action information that is associated with these current activities (operation 232). Furthermore, server computer 212 may identify the one or more current activities (operation 234). For example, using the user-activity model, server computer 212 may determine a group of the identified subsets of the user-action information based on the additional user-action information. In addition, server computer 212 may use the one or more identified current user activities (operation 236). This may include: filling out an entry in a time sheet or card for the user; assisting the user in managing their time (such as helping the user use their time more efficiently); maintaining a schedule for the user; alerting others when the user can be contacted without interrupting the one or more current user activities; and/or updating a social-network web page of the user or providing a social-network message (such as a text message or a tweet). In this last example, the computer system may protect the user's privacy, for example, by restricting the content in any posting to words or topics that have previously been posted.

In an exemplary embodiment, the user-activity identification technique leverages machine and human capabilities (although, in other embodiments the technique can be implemented entirely using a computer). In particular, machine intelligence is used to aggregate user-action information (such as information in emails and documents that the user interacts with), and human intelligence is used to determine the portion of this aggregated user-action information that is useful for user-activity identification or recognition. For example, a user can define or specify desktop-activity labels for groups or clusters of aggregated user-action information that are relevant to their activities. Subsequently, the defined activity labels and the aggregated user-action information can be used by a user-activity detector (such as a user-activity model or, more generally, a supervised learning model) in conjunction with current user-activity information to identify current activities by predicting (or identifying) the associated activity labels. Furthermore, this identification can occur in real time (e.g., within a few seconds) or near real time (e.g., within a few minutes).

Figure 3:
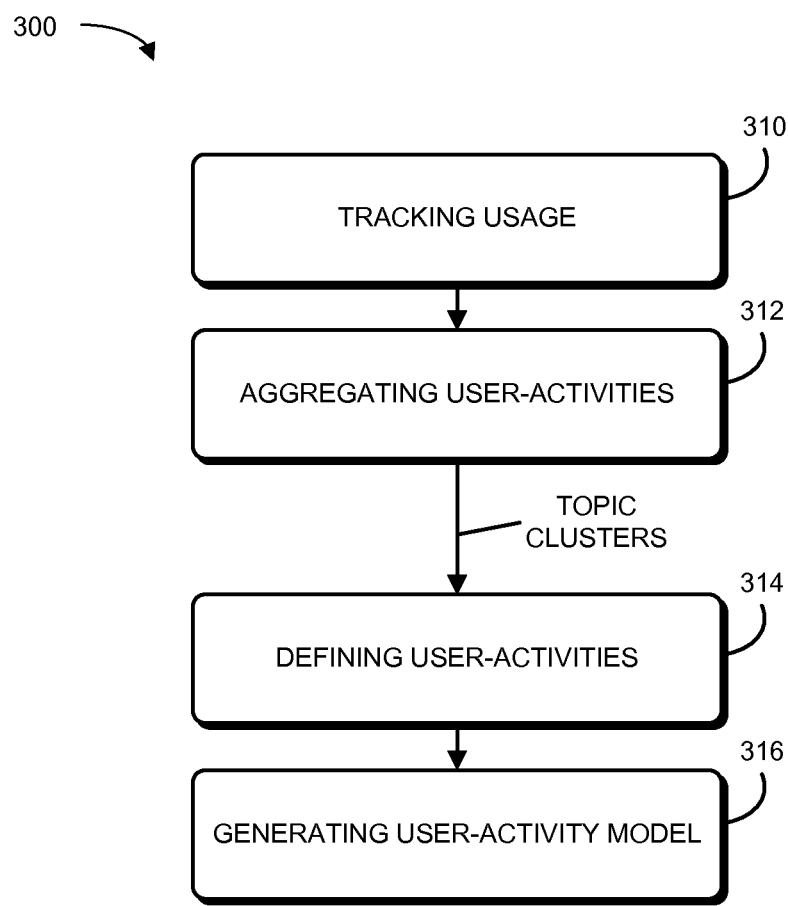
FIG. 3 is a flow chart illustrating a method for constructing a user-activity model in accordance with an embodiment of the present disclosure.

This technique is illustrated in FIG. 3, which presents a flow chart illustrating a method 300 for constructing a user-activity model. When tracking usage (operation 310), emails, documents and web pages that the user accesses and modifies may be logged, and their content (such as text) and meta-information (which, collectively, are referred to as user-action information) may be automatically extracted by the computer system. Furthermore, personal information (such as a sender or recipient in an email, or an individual that is determined by entity extraction from the content of a document) may also be detected, and weighted (or sorted) based on their relative importance (which may be indicated by the amount of time the user viewed the document or an occurrence frequency of a word or phrase in the document). In addition, information in the user's schedule or calendar (such as regular meetings or appointments) may be included in the aggregated user-action information.

Words or phrases that occur in the collected user-action information may be filtered using term frequency-inverse document frequency (tf-idf) thresholds (e.g., frequencies of occurrence of words in the documents in a corpus may be determined, and those that occur too often may be filtered out). Moreover, bi-grams (or n-grams) may be detected in the text and may also be filtered using tf-idf. (For example, words that co-occur or that have a spatial relationship in a sentence, even if there are intervening words, may be treated as a single notion). Furthermore, words that are unlikely to be useful when identifying user activities (such as prepositions and conjunctions), as well as stop words, may be removed. In addition, in order to filter out mailing lists and spam emails, the retained terms may be sorted based on their frequency of occurrence (or importance) and balance.

Then, when aggregating user-activities (operation 312), clustering analysis may be used to isolate a limited number of keyword clusters (which are sometimes referred to as 'topic clusters'). For example, the clustering analysis may involve word and bi-gram (or n-gram) frequencies, such as Latent Dirichlet Allocation (LDA). Note that LDA has been used to efficiently extract underlying topics (i.e., clusters or collections of keywords) that are associated with the documents using the retained terms/bi-grams from each document.

Note that, to facilitate clustering of topics without requiring a lengthy period of real-time observation of the user's document-access activity, 'from scratch' estimates may be obtained by crawling emails (in an email repository) and documents (such as those on a hard disk) that were modified after a specified time point (e.g., one month ago). These emails/documents may then be used as the starting point when estimating the topic clusters. Furthermore, user-action information collection may be performed when the user is not using (or is less likely to be using) their computer.

Next, when defining user-activities (operation 314), the user may manually provide activity labels (which are sometimes referred to as classifications). For example, the computer system may propose clusters of topics, people and events that the user can label by providing activity labels. During this operation, the user may combine one or more of the identified clusters by assigning a common activity label to them. In addition, the user may specify a scalar value that indicates how likely it is that a specific cluster or group of user-action items (such as persons, topics, meetings or events) is associated with the associated user-provided activity label.

Figure 4:
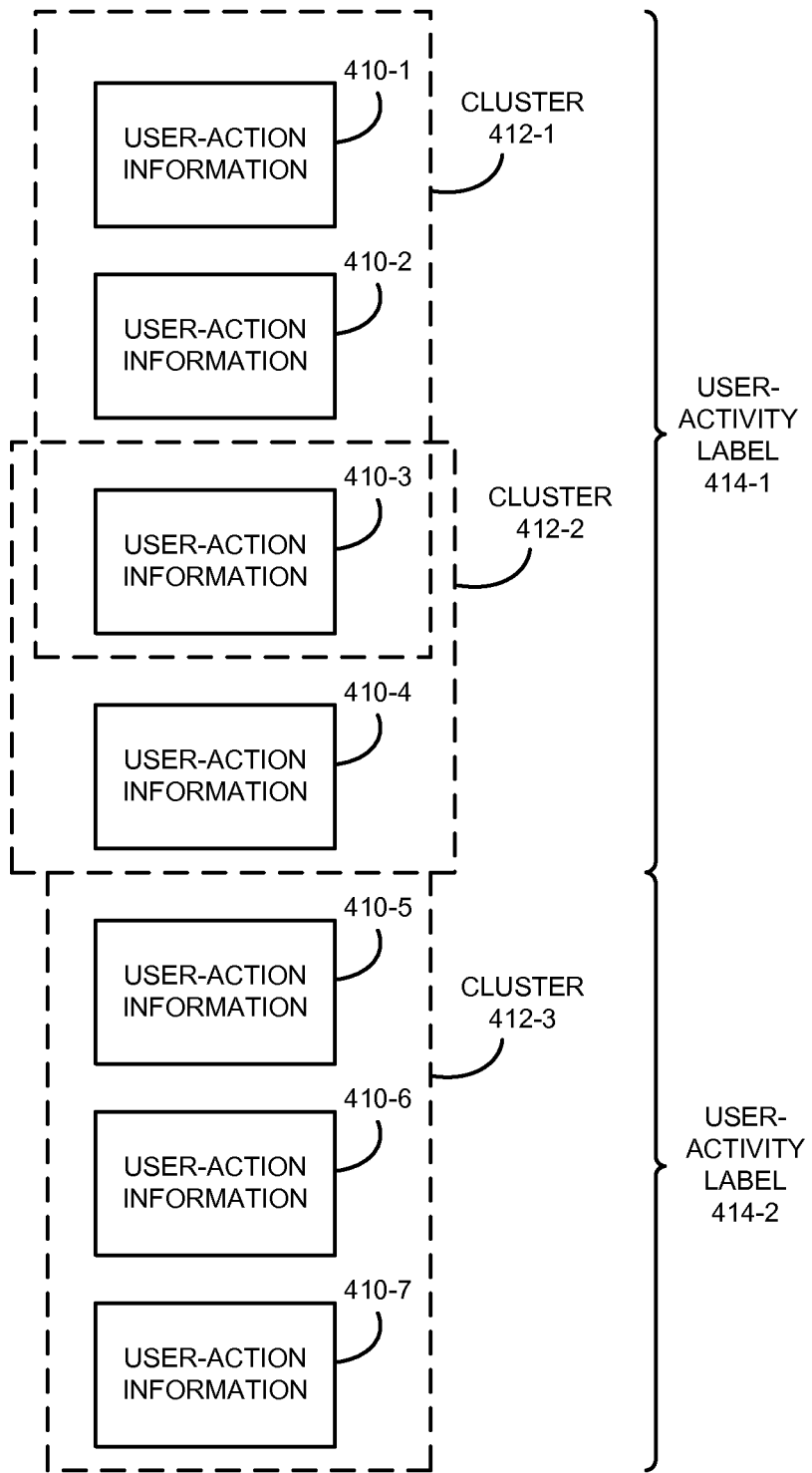
FIG. 4 is a drawing illustrating subsets of the user-action information and associated classifications in accordance with an embodiment of the present disclosure.

The aggregation and classification operations are illustrated in FIG. 4, which presents a drawing illustrating subsets of the user-action information and associated classifications. In particular, user-action information 410 may be aggregated into clusters 412, and activity labels 414 may be associated with one or more of clusters 412 by the user.

Referring back to FIG. 3, the combination of the clusters and the associated activity labels may be used to generate a user-activity model (operation 316), such as a supervised-learning model that associates new or current user-action information with one or more of the identified and labeled clusters. For example, the supervised-learning model may be based on a technique such as: classification and regression trees (CART), support vector machines (SVM), linear regression, non-linear regression, ridge regression, LASSO, and/or a neural network.

Figure 5:
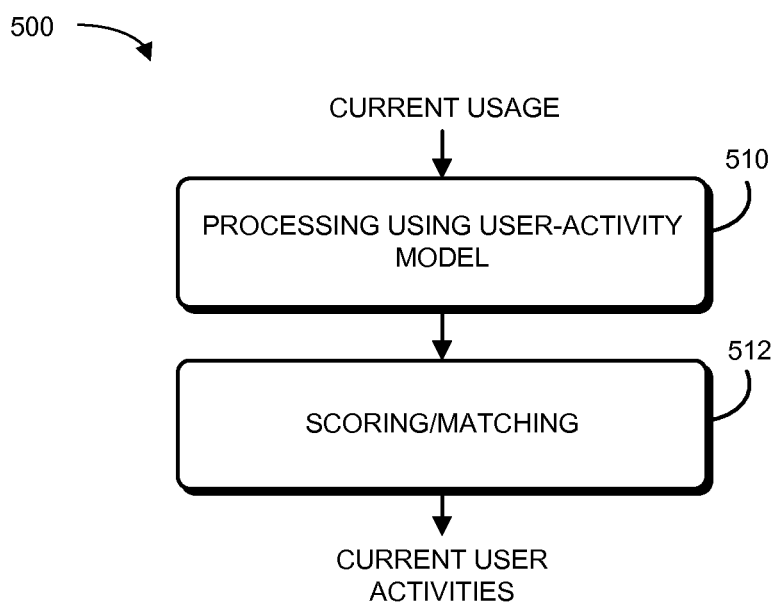
FIG. 5 is a flow chart illustrating a method for identifying a current user activity using the user-activity model in accordance with an embodiment of the present disclosure.

Current user-activity identification is illustrated in FIG. 5, which presents a flow chart illustrating a method 500 for identifying a current user activity using the user-activity model. During this method, current usage of the computer by the user (i.e., current user-action information) is collected and input to the user-activity model for processing (operation 510). Then, scoring or matching occurs (operation 512) to identify the (most probable) current user activities.

For example, different topic clusters (such as topic keywords, people lists and event lists) may be 'matched' with the currently accessed document(s) and email(s) (i.e., the document(s) that are the current focus on the user's desktop). Then, the text in this document(s) may be extracted, and scores for each topic cluster may be calculated. In particular, the scores may be calculated using a weighted sum of all the keyword matches in a given topic cluster. Note that the weighting may ensure that the more important a keyword is in the given topic cluster, the larger its contribution to the corresponding weighted sum. Furthermore, a limited number of the 'best' topic clusters (such as those with the highest scores) may be used during the user-activity identification. One or more of these 'best' topic clusters may be used to identify the current user-activities. Alternatively or additionally, the top-N (such as the top-3) 'best' topic clusters may be presented in real time (or near real time) to the user.

In some embodiments of methods 100 (FIGS. 1 and 2), 300 (FIG. 3) or 500 there may be additional or fewer operations. Moreover, the order of the operations may be changed, and/or two or more operations may be combined into a single operation.

Figure 6:
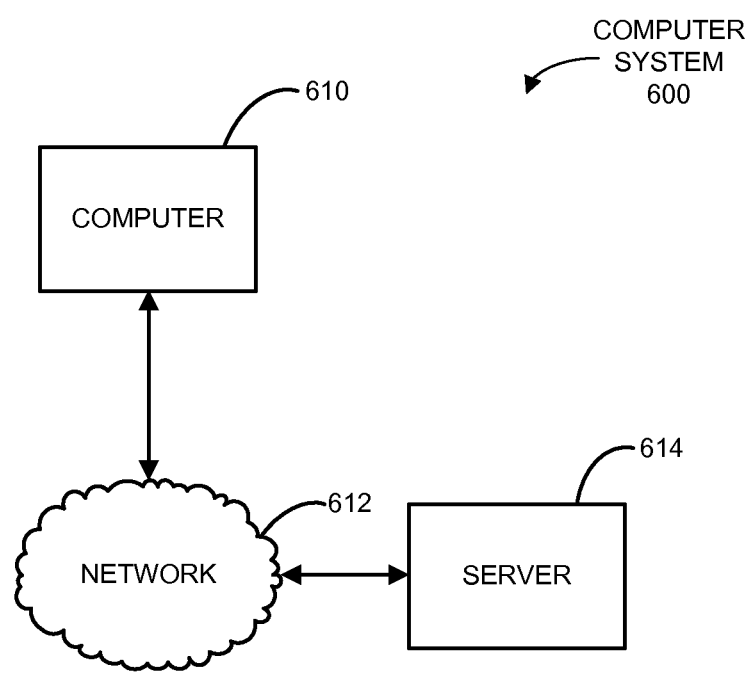
FIG. 6 is a block diagram illustrating a computer system that performs the method of FIGS. 1 and 2 in accordance with an embodiment of the present disclosure.

We now describe embodiments of the computer system and its use. FIG. 6 presents a block diagram illustrating a computer system 600 that performs method 100 in FIGS. 1 and 2. In this computer system, actions of a user while using computer 610 may be monitored. For example, the user-action information (which is associated with one or more user activities) may be tracked or monitored using a software application that is resident on and that executes on computer 610. Note that this software application may be a stand-alone application or a portion of another application. Alternatively, the user-action information may be tracked using a user-action software application tool that is embedded in a web page (which is provided by server 614 via network 612), and which executes in a virtual environment of the web browser. For example, the user-action software application tool is a software package written in: JavaScript™ (a trademark of Oracle Corporation), e.g., the user-action software application tool includes programs or procedures containing JavaScript instructions, ECMAScript (the specification for which is published by the European Computer Manufacturers Association International), VBScript™ (a trademark of Microsoft Corporation) or any other client-side scripting language. In other words, the embedded user-action software application tool may include programs or procedures containing: JavaScript, ECMAScript instructions, VBScript instructions, or instructions in another programming language suitable for rendering by the web browser or another client application (such as on computer 610). Thus, the user-action software application tool may be provided to the user via a client-server architecture.

As discussed previously, server 614 may aggregate the user-action information to identify subsets of the user-action information. Then, the user may be queried to provide classifications (such as activity labels) for one or more of the subsets. For example, server 614 may communicate a request for the classifications via network 612, and the user's response(s) may be received from computer 610 via network 612.

Subsequently, when additional user-action information (which is associated with one or more current user activities) is tracked and provided to server 614, this additional user-action information may be associated with one or more of the identified and classified subsets of the user-action information. For example, a supervised learning technique may be used to train a user-activity model. This model may then be used to determine associations between the additional user-action information and one or more of the classified subsets of the user-action information. Furthermore, the subset with the strongest association or a pattern of association (with two or more of the subsets) may be used to identify the one or more current user activities.

Figure 7:
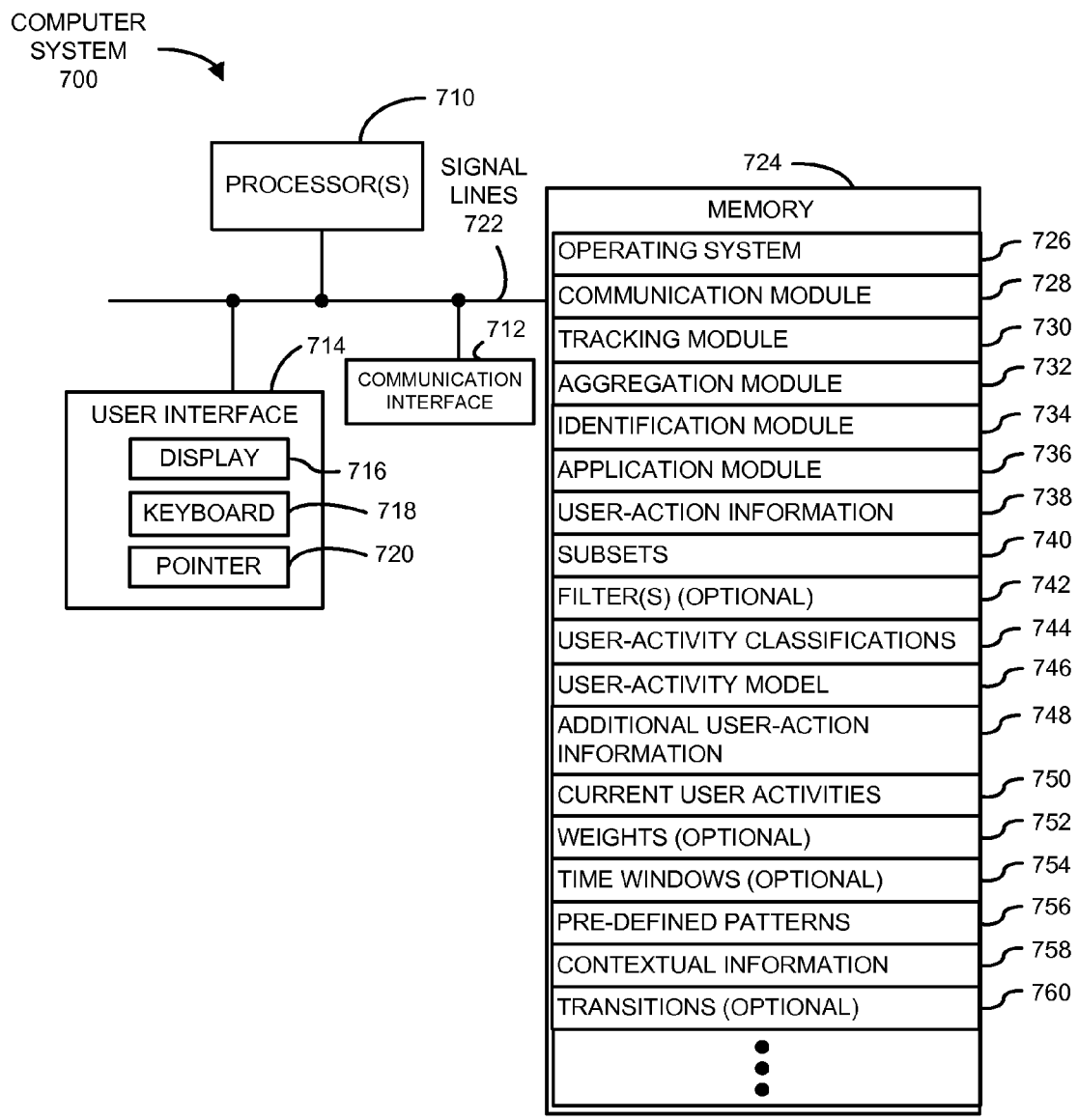
FIG. 7 is a block diagram illustrating a computer system that performs the method of FIGS. 1 and 2 in accordance with an embodiment of the present disclosure.

FIG. 7 presents a block diagram illustrating a computer system 700 that performs method 100 in FIGS. 1 and 2, such as server 614 in FIG. 6. This computer system includes: one or more processors 710, a communication interface 712, a user interface 714, and one or more signal lines 722 coupling these components together. Note that the one or more processing units 710 may support parallel processing and/or multi-threaded operation, the communication interface 712 may have a persistent communication connection, and the one or more signal lines 722 may constitute a communication bus. Moreover, the user interface 714 may include: a display 716 (such as a touch-sensitive display), a keyboard 718, and/or a pointer 720, such as a mouse.

Memory 724 in the computer system 700 may include volatile memory and/or non-volatile memory. More specifically, memory 724 may include: ROM, RAM, EPROM, EEPROM, flash, one or more smart cards, one or more magnetic disc storage devices, and/or one or more optical storage devices. Memory 724 may store an operating system 726 that includes procedures (or a set of instructions) for handling various basic system services for performing hardware-dependent tasks. In some embodiments, the operating system 726 is a real-time operating system. While not shown in FIG. 7, in some embodiments memory 724 includes a web browser. Memory 724 may also store communication procedures (or a set of instructions) in a communication module 728. These communication procedures may be used for communicating with one or more computers, devices and/or servers, including computers, devices and/or servers that are remotely located with respect to the computer system 700.

Memory 724 may also include multiple program modules (or sets of instructions), including: tracking module 730 (or a set of instructions), aggregation module 732 (or a set of instructions), identification module 734 (or a set of instructions) and/or application module 736 (or a set of instructions). Note that one or more of these program modules may constitute a computer-program mechanism.

Tracking module 730 may monitor or track user-action information 738 (which is associated with one or more user activities) when a user is using a computer (or, more generally, an electronic device). For example, tracking module 730 may perform event tracking while the user is using the computer.

Figure 8:
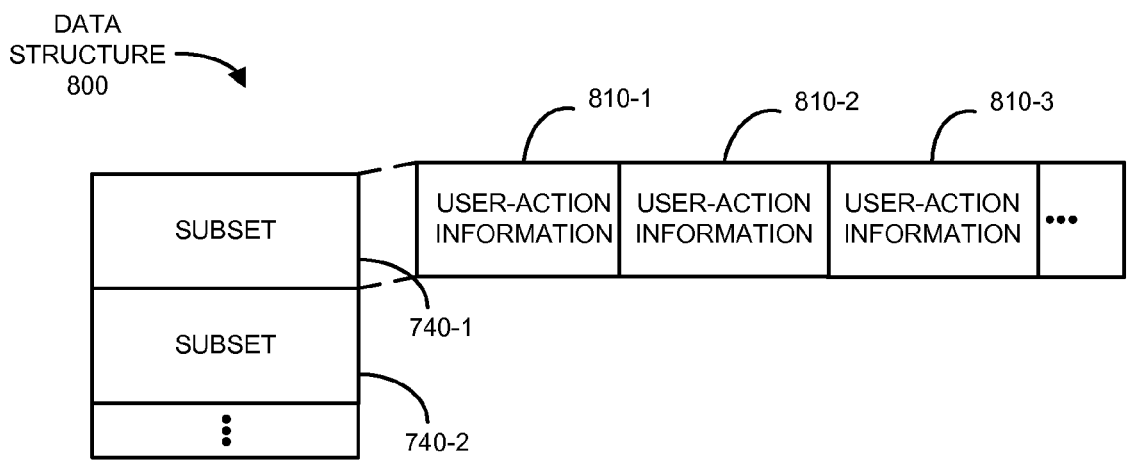
FIG. 8 is a block diagram illustrating a data structure for use in the computer system of FIG. 7 in accordance with an embodiment of the present disclosure.

Then, as shown in computer-readable data structure 800 in FIG. 8, aggregation module 732 may identify subsets 740 of user-action information 738 (such as user-action information 810 in FIG. 8), for example, by performing clustering analysis on the unsupervised (i.e., unlabeled) data. In some embodiments, aggregation module 732 filters user-action information 738 using one or more optional filters 742 to eliminate extraneous user-action information prior to identifying subsets 740. Furthermore, aggregation module 732 may request (via communication module 728), and may receive, user-activity classifications 744 from the user for one or more of subsets 740. For example, the user may specify that several of subsets 740 are associated with a particular user activity. Thus, classifications 744 may include user-activity labels for groups of one or more subsets 740.

In conjunction with classifications 744, subsets 740 may constitute supervised (i.e., labeled) data. As such, identification module 734 may train a user-activity model 746 using a supervised learning technique to determine associations between user-action information 738 and one or more of subsets 740. Subsequently, when additional user-action information 748 (which occurs after user-action information 738) is received, identification module 734 may use user-activity model 746 to determine one or more of subset 740 that are associated with additional user-action information 748, thereby identifying one or more current user activities 750.

Note that determining one or more of subsets 740 may involve generating probabilistic scores for subsets 740 based on additional user-action information 748, optional weights 752 and/or optional time windows 754. For example, a given probabilistic score for a given subset of the user-action information may be generated using a weighted summation of matches between additional user-action information 748 and the user-action information in the given subset of the user-action information during a time window (such as a week preceding additional user-action information 748). As a consequence, in some embodiments user-activity model 746 includes a temporal model, such as a hidden Markov model in which there are multiple user actions (which are directly observed via user-action information 738 or additional user-action information 748) per state (i.e., per user activity), which are inferred using user-activity model 746.

Alternatively or additionally, determining one or more of subsets 740 may involve: selecting one of pre-defined patterns 756 (such as groups of two or more of subsets 740) based on the association values (such as the probabilistic scores); using contextual information 758 associated with additional user-action information 748 (such as a time, a day, and/or a source of additional user-action information 748); and/or optional transitions 760 between tasks (in a temporal sequence of multiple tasks) that the user is performing when user-action information 738 and/or additional user-action information 748 are tracked. In the last example, identification module 734 may identify optional transitions 760, for example, by task durations or user behavior (such as using a different software application on the computer, opening another document, making or ending a phone call, starting or ending a conversation, etc.).

After identifying one or more current user activities 750, application module 736 may use identified current user activities 750 in a variety of ways. For example, application module 736 may update a time card (not shown), or may provide an activity update (via communication module 728) to another user or another server (such as one that hosts a social-network web page of the user). Alternatively or additionally, application module 736 may offer (or pre-fetch) resources or documents that are frequently used during an activity, thereby improving the user's efficiency and/or productivity.

Instructions in the various modules in memory 724 may be implemented in: a high-level procedural language, an object-oriented programming language, and/or in an assembly or machine language. This programming language may be compiled or interpreted, i.e., configurable or configured, to be executed by the one or more processing units 710.

Although computer system 700 is illustrated as having a number of discrete items, FIG. 7 is intended to be a functional description of the various features that may be present in computer system 700 rather than a structural schematic of the embodiments described herein. In practice, and as recognized by those of ordinary skill in the art, the functions of the computer system 700 may be distributed over a large number of devices or computers, with various groups of the devices or computers performing particular subsets of the functions. In some embodiments, some or all of the functionality of computer system 700 may be implemented in one or more application-specific integrated circuits (ASICs) and/or one or more digital signal processors (DSPs).

Computers and servers in computer systems 600 (FIG. 6) and/or 700 may include one of a variety of devices capable of manipulating computer-readable data or communicating such data between two or more electronic devices over a network, including: a computer terminal, a desktop computer, a laptop computer, a server, a mainframe computer, a kiosk, a portable electronic device (such as a cellular phone or PDA), a server and/or a client computer (in a client-server architecture). Moreover, network 612 (FIG. 6) may include: the Internet, World Wide Web (WWW), an intranet, LAN, WAN, MAN, or a combination of networks, or other technology enabling communication between computing systems.

In some embodiments, computer systems 600 (FIG. 6) and/or 700, as well as data structure 800 (FIG. 8), include fewer or additional components. Moreover, two or more components may be combined into a single component and/or a position of one or more components may be changed. Moreover, the functionality of the computer systems may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for identifying one or more current user activities, comprising:
 obtaining, by a computer, user-action information associated with a current user activity, wherein the current user activity is initially unspecified, and wherein the user-action information is gathered automatically without user intervention and comprises unsupervised data corresponding to the activity's primitive operations;
 identifying, from a plurality of classified user-action information subsets that each comprises supervised data, one or more classified user-action information subsets whose associated user-action information matches the received user-action information;
 calculating a weighted sum of the identified matches;
 calculating, based on the weighted sum, a probability that a current user activity corresponds to a respective classified user-action information subset;
 determining, based on the calculated probability, a classified user-action-information subset which corresponds to the received additional user-action information;
 identifying a classified user activity that corresponds to the determined user-action-information subset.

2. The method of claim 1, wherein obtaining the user-action information involves monitoring user interactions with an electronic device.

3. The method of claim 2, wherein the obtained user-action information includes one or more of: a keyword associated with a document accessed by the user, the document accessed by the user, an individual with whom the user communicates information, and an appointment in a user's schedule.

4. The method of claim 1, wherein the user activities include a temporal sequence of user actions that modify content or communicate information.

5. The method of claim 4, wherein the temporal sequence of user actions occurs over multiple sessions.

6. The method of claim 4, wherein the user activities are associated with one or more corresponding objectives of a project.

7. The method of claim 1, wherein determining the association between the at least one labeled user-action-information subset and the additional user-action information involves generating probabilistic scores for the user-action-information subsets based on the additional user-action information.

8. The method of claim 7, wherein determining the association between the at least one labeled user-action-information subset and the additional user-action information involves selecting a pre-defined group of the user-action-information subsets based on the generated probabilistic scores.

9. The method of claim 7, wherein the probabilistic scores are generated using corresponding user-action information in the given user-action-information subset that is associated with a time window preceding the one or more current user activities.

10. The method of claim 1, wherein the obtained user-action information and the received additional user-action information are each associated with tasks;
 wherein a given user activity is associated with a temporal sequence of multiple tasks;

wherein the method further comprises identifying transitions between the tasks based on the user-action information or the additional user-action information; and wherein determining the association between the at least one user-action-information subset and the additional user-action information is based on the identified transitions.

11. The method of claim 1, wherein determining the association between the at least one labeled user-action-information subset and the additional user-action information is based on contextual information associated with the additional user-action information.

12. The method of claim 1, wherein the method further comprises updating a time card of the user based on the identified one or more current user activities.

13. The method of claim 1, wherein the method further comprises providing an activity update to another individual based on the identified one or more current user activities.

14. The method of claim 13, wherein the activity update alerts the other individual when the user can be contacted without interrupting the one or more current user activities.

15. The method of claim 1, further comprising:
obtaining user-action information associated with user activities for one or more users, wherein the user activities are initially unspecified and the obtained user-action information comprises unsupervised data; and
clustering the obtained user-action information to generate one or more user-action information subsets.

16. The method of claim 15, further comprising:
receiving, from a user, an activity label that is to be applied to a respective user-action-information subset; and
classifying the respective user-action-information subset by associating the activity label with the respective user-action-information subset.

17. A non-transitory computer-program product for use in conjunction with a computer system, the computer-program product comprising a computer-readable storage medium and a computer-program mechanism embedded therein to identify one or more current user activities, the computer-program mechanism including:
instructions for obtaining user-action information associated with a current user activity, wherein the current user activity is initially unspecified, and wherein the user-action information is gathered automatically without user intervention and comprises unsupervised data corresponding to the activity's primitive operations;
instructions for identifying, from a plurality of classified user-action information subsets that each comprises supervised data, one or more classified user-action information subsets whose associated user-action information matches the received user-action information;
instructions for calculating a weighted sum of the identified matches;
instructions for calculating, based on the weighted sum, a probability that a current user activity corresponds to a respective classified user-action information subset;
instructions for determining, based on the calculated probability, a classified user-action-information subset which corresponds to the received additional user-action; and
instructions for identifying a classified user activity that corresponds to the determined user-action-information subset.

18. A computer system, comprising:
a processor;
memory; and
a program module, wherein the program module is stored in the memory and configured to be executed by the processor, the program module to identify one or more current user activities, the program module including:
instructions for obtaining user-action information associated with a current user activity, wherein the current user activity is initially unspecified, and wherein the user-action information is gathered automatically without user intervention and comprises unsupervised data corresponding to the activity's primitive operations;
instructions for identifying, from a plurality of classified user-action information subsets that each comprises supervised data, one or more classified user-action information subsets whose associated user-action information matches the received user-action information;
instruction for calculating a weighted sum of the identified matches;
instruction for calculating, based on the weighted sum, a probability that a current user activity corresponds to a respective classified user-action information subset;
instructions for determining, based on the calculated probability, a classified user-action-information subset which corresponds to the received additional user-action information; and
instructions for identifying a classified user activity that corresponds to the determined user-action-information subset.

* * * * *